United States Patent
Joshi et al.

(10) Patent No.: US 12,216,267 B2
(45) Date of Patent: Feb. 4, 2025

(54) SYSTEM AND METHOD FOR ADJUSTING ONE OR MORE PROPERTIES OF A DEFORMABLE LENS

(71) Applicant: Toyota Motor Engineering & Manufacturing North America, Inc., Plano, TX (US)

(72) Inventors: Shailesh N. Joshi, Ann Arbor, MI (US); Ercan Mehmet Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 643 days.

(21) Appl. No.: 17/550,541

(22) Filed: Dec. 14, 2021

(65) Prior Publication Data
US 2023/0185075 A1    Jun. 15, 2023

(51) Int. Cl.
G02B 26/00 (2006.01)
G02B 1/04 (2006.01)
G02B 3/14 (2006.01)

(52) U.S. Cl.
CPC ........... *G02B 26/004* (2013.01); *G02B 1/041* (2013.01); *G02B 3/14* (2013.01)

(58) Field of Classification Search
CPC ......... G02B 26/004; G02B 1/041; G02B 3/14
See application file for complete search history.

(56) References Cited

U.S. PATENT DOCUMENTS

| 6,545,816 B1 | 4/2003 | Kroupenkine et al. |
| 2018/0239214 A1* | 8/2018 | Ji ............................ G02F 1/293 |

OTHER PUBLICATIONS

Stoychev,G. et al., "Light Responsive Shape-Changing Polymers", Advanced Optical Materials, Mar. 18, 2018, in 31 pages.
Qin, L. et al., "Soft Actuators of Liquid Crystal Polymers Fueled by Light from Ultraviolet to Near Infrared", Advanced Optical Materials, Feb. 2, 2021, in 27 pages.
Li, Q. et al., "Light-Responsive Smart Soft Matter Technologies", Advanced Optical Materials, (2019), in 3 pages.
Li, C. "Light-Driven Expansion of Spiropyran Hydrogels", Journal of the American Chemical Society, (2020), in 26 pages.
Feng, W. et al, "Functional Liquid Crystal Polymer Surfaces with Switchable Topographies", Small Structures, Oct. 9, 2020, in 14 pages.
Huang, S. et al., "Photodeformable Liquid Crystalline Polymers Containing Functional Additives: Toward Photomanipulatable Intelligent Soft Systems", Small Structures, (2021), in 14 pages.
Ghilardi, M. et al., "Smart Lenses with Electrically Tuneable Astigmatism", Scientific Reports, (2019), in 10 pages.
Mishra, K. et al., "Recent Developments in Optofluidic Lens Technology", Micromachines, Jun. 10, 2016, in 24 pages.

* cited by examiner

*Primary Examiner* — James C. Jones
(74) *Attorney, Agent, or Firm* — Christopher G. Darrow; Darrow Mustafa PC

(57) ABSTRACT

Systems and methods for adjusting one or more properties of a deformable lens are described herein. The deformable lens includes a photoswitch material that, when irradiated by a radiation, causes a curvature of a surface of the deformable lens to change from a first curvature to a second curvature based on the intensity of the radiation.

17 Claims, 8 Drawing Sheets

SYSTEM AND METHOD FOR ADJUSTING ONE OR MORE PROPERTIES OF A DEFORMABLE LENS

TECHNICAL FIELD

The subject matter described herein relates, in general, to systems and methods for adjusting one or more properties of a deformable lens.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

An optical lens, sometimes simply referred to as a lens, is a transmissive optical device that focuses or disburses a light beam through refraction. The focus or disbursement of a light beam is based, at least in part, on the shape of the lens. For example, in the case of a bi-convex lens, the focal point in the magnification factor is at least partially dependent on the curvature angle of the surfaces. Higher curvature angles lead to shorter focal lengths because light waves are reflected at a greater angle with respect to the lens's optical axis.

However, many lenses have fixed physical properties. Because of this, these lenses are typically used for fixed applications, which do not require that the lenses have different physical properties, such as different curvatures. In situations where a different curvature is required, a different fixed lens is utilized.

SUMMARY

This section generally summarizes the disclosure and does not comprehensively explain its full scope or all its features.

In one embodiment, an optical device includes a deformable lens. The deformable lens includes a photoswitch material that, when irradiated by a radiation, causes a curvature of a surface of the deformable lens to change from a first curvature to a second curvature based on the intensity of the radiation.

In another example, a system includes a deformable lens, a processor, a light source in communication with the processor, and a memory in communication with the processor. The deformable lens includes a photoswitch material that, when irradiated by a radiation, causes a curvature of a surface of the deformable lens to change from a first curvature to a second curvature based on the intensity of the radiation emitted by the light source.

The memory includes a control module having instructions that, when executed by the processor, cause the processor to adjust the intensity of the radiation output by the light source to adjust the curvature of the surface of the deformable lens. The processor may adjust the intensity of the radiation output by the light source based on a signal from a sensor or an input device. If a sensor is utilized to generate the signal, the sensor may determine the intensity of the radiation output by the light source and/or the curvature of the surface of the deformable lens. This information can then be utilized to adjust the intensity of the radiation output by the light source.

In another example, a method may include the step of adjusting an intensity of a radiation output by a light source to a deformable lens. Like before, the deformable lens may include a photoswitch material that, when irradiated by a radiation, causes a curvature of a surface of the deformable lens to change from a first curvature to a second curvature based on the intensity of the radiation. The adjusting of the intensity of the light source may be based on the intensity of the light source, the curvature of the deformable lens, or an input from an input device.

Further areas of applicability and various methods of enhancing the disclosed technology will become apparent from the description provided. The description and specific examples in this summary are intended for illustration only and do not limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
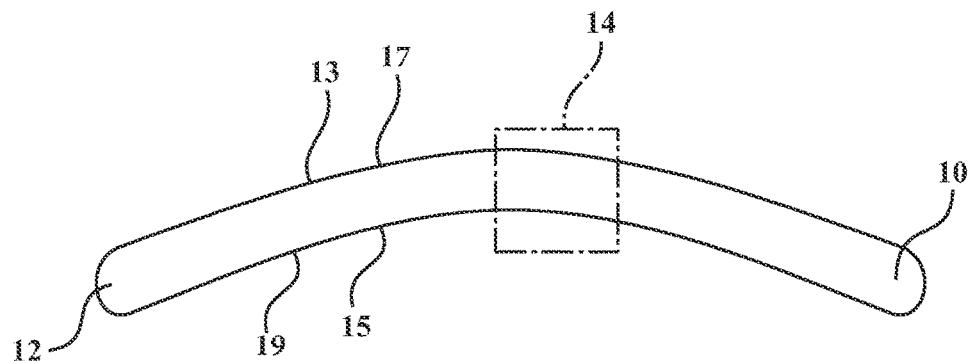
FIG. 1 illustrates a deformable lens having a photoswitch material.

Described is an optical device that includes a deformable lens. The deformable lens includes a photoswitch material that, when irradiated by radiation, such as ultraviolet (UV) light, causes the curvature of a surface of the deformable lens to change. The curvature of the surface of the deformable lens may depend on the intensity and/or duration of the radiation provided to the deformable lens.

The photoswitch material that causes the change in curvature of the deformable lens may be spiropyran. Spiropyran is a type of organic chemical compound having photosensitive properties. Spiropyran based materials interconvert between two isomers—a ring closed spiropyran form and a ring-opened merocyanine form that have different dipole moments, molecular volumes, and polarity. When incorporated within a hydrogel, spiropyran hydrogels expand when exposed to certain types of radiation, such as UV light. As such, the deformable lens that includes spiropyran can deform when exposed to a UV light source, thus causing a change in the curvature of the surface of the deformable lens.

The deformable lens may be mounted to a layer that may be transparent. In one example, the transparent layer may include one or more UV light sources in the form of light-emitting diodes (LEDs) configured to selectively emit UV light. Depending on the intensity and/or duration of the UV light emitted by the LEDs incorporated within the transparent layer, the deformable lens will deform and change a curvature of at least one surface of the deformable lens. Another light source, such as a visible light source, can be arranged to project through the transparent layer and the deformable lens. As such, the UV light emitted by the LEDs causes a surface of the deformable lens to change its curvature, which can then adjust the projection of the light emitted by the visible light source. The deformable lens and its surfaces typically resume their original shape when no longer being irradiated by one or more UV light sources. As such, the shape of the deformable lens and/or the curvature of at least one of the surfaces of the deformable lens when irradiated change. Upon removing the radiation, the shape of the deformable lens and/or the curvature of at least one of the surfaces of the deformable lens may resume their original shapes and/or curvatures.

In another example, the deformable lens may be mounted to a waveguide. A UV light source can be arranged to project light into the waveguide, which will then be directed to the deformable lens via the waveguide using one or more diffraction gratings. A visible light source may be mounted to project light to the deformable lens through the waveguide. The UV light emitted by the UV light source causes the deformable lens to change its curvature, adjusting the projection of the light emitted by the visible light source.

The duration and/or intensity of UV light provided to the deformable lens can be controlled by a control system that includes a processor. The control system may control the duration and/or intensity of the UV light provided to the deformable lens in response to an input device and/or measurements taken by a sensor. For example, the control system may effectively create a feedback loop wherein the sensor can measure the curvature and/or the intensity of the UV light directed to the deformable lens, and the processor can adjust the UV light emitted in response to these measurements.

Referring to FIG. 1, illustrated is a deformable lens 10. The deformable lens 10 may be made of a material that can deform under certain circumstances, such as circumstances described in this disclosure. In one example, the deformable lens 10 may be made of a deformable thermoplastic, such as acrylics and silicones. The deformable lens 10 may take any one of a number of different shapes. In this example, the deformable lens 10 is a meniscus lens that includes a first surface 13 having a first curvature 17 and a second surface 15 having a second curvature 19. As such, being a meniscus lens, the first surface 13 is a convex surface while the second surface 15 is a concave surface. An edge 12 of the deformable lens 10 is defined at the perimeter of the deformable lens 10 adjacent to where the first surface 13 and second surface 15 meet.

Again, the deformable lens 10 may take any one of a number of different shapes. As such, instead of being a meniscus lens as shown, the deformable lens 10 may be any type of transmissive optical device that focuses or disperses a light beam employing diffraction. As such, the deformable lens 10 may be biconcave, biconvex, plano-convex, or variations thereof.

The deformable lens 10 includes a photoswitch material, which may be spiropyran or spiropyran based material. As explained earlier, spiropyran and/or spiropyran based materials can expand when exposed to radiation, such as UV light. The photoswitch material may be incorporated within the deformable lens 10 or coated on one or more surfaces of the deformable lens 10.

Figure 2A:
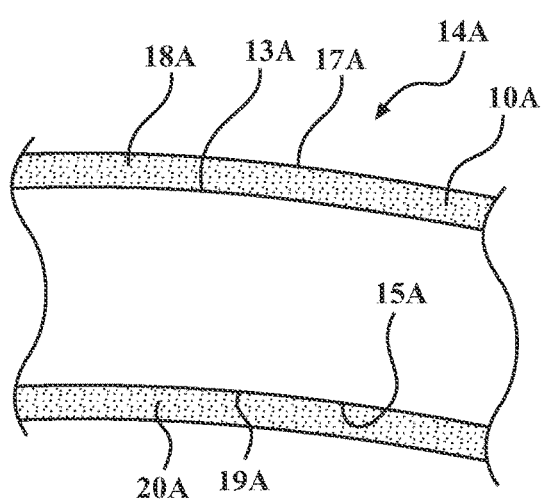
FIGS. 2A and 2B illustrate different examples of the locations of a photoswitch material with respect to the deformable lens.

For example, FIG. 2A illustrates a portion 14A of the deformable lens 10. The portion 14A in FIG. 2A is illustrated in FIG. 1 as the portion 14. Like reference numerals refer to like elements. In this example, coatings 18A and 20A have been coated onto the first surface 13A and the second surface 15A of the deformable lens 10A, respectively. While both the surfaces 13A and 15A are shown to be coated, it should be understood that it is also possible that only one of the surfaces 13A or 15A may be coated. In some cases, the coatings 18A and 20A coated onto the deformable lens 10A may be made of a deformable material, similar to the material utilized to make the deformable lens 10A, such as deformable thermoplastics, which have been infused with the photoswitch material.

Figure 2B:
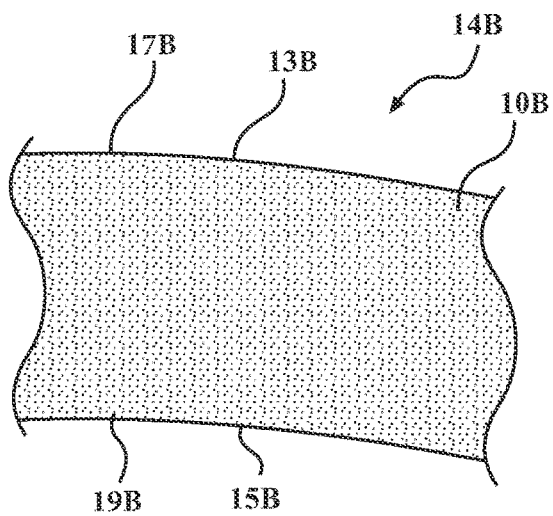

In another example, FIG. 2B illustrates a portion 14B of the deformable lens 10. Like before, the portion 14B in FIG. 2B is illustrated in FIG. 1 as the portion 14. Like reference numerals refer to like elements. In this example, instead of utilizing coatings that have been infused with a photoswitch material, the deformable lens 10B has been infused with the photoswitch material. When manufactured, the material forming the deformable lens 10B may have been mixed with the photoswitch material, causing the photoswitch material to be infused within the deformable lens 10B.

Figure 3A:
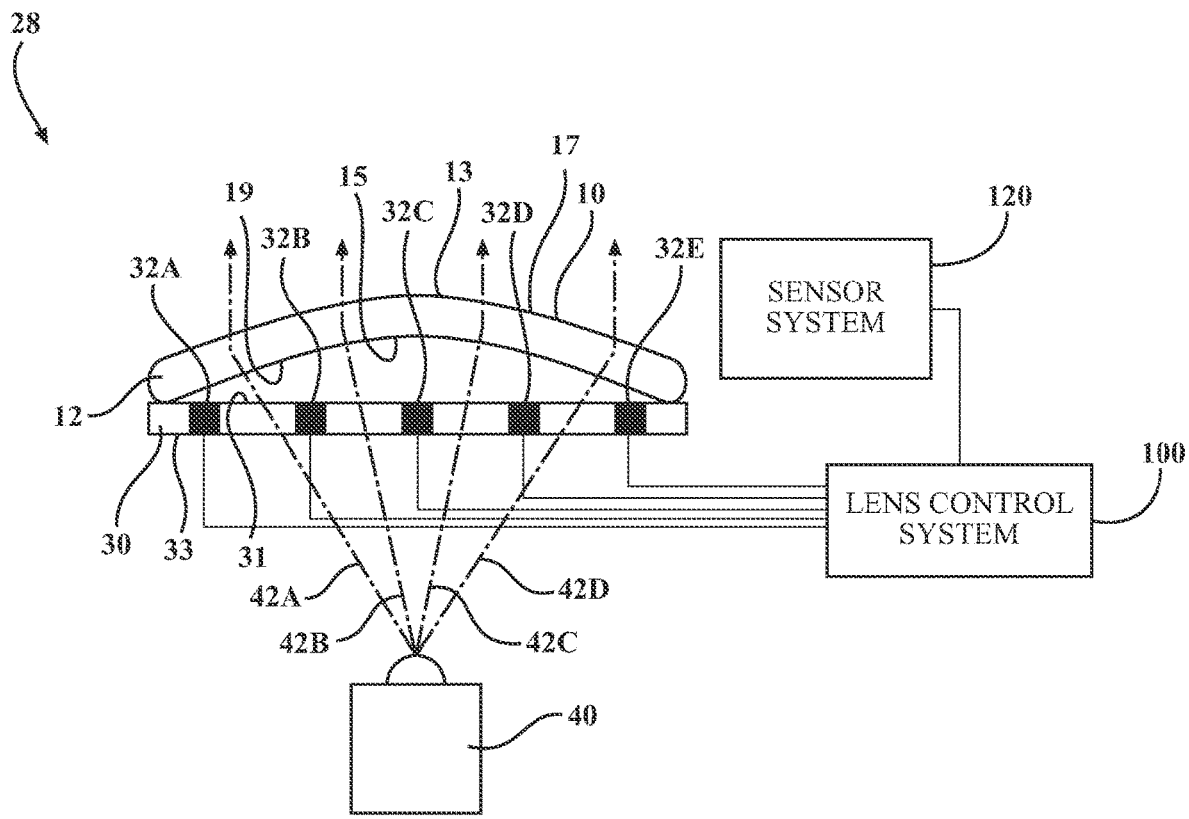
FIGS. 3A and 3B illustrate views of an optical device having the deformable lens of FIG. 1 mounted on a transparent substrate having light sources that, when actuated, cause a curvature of a surface of the deformable lens to change.
Figure 3B:
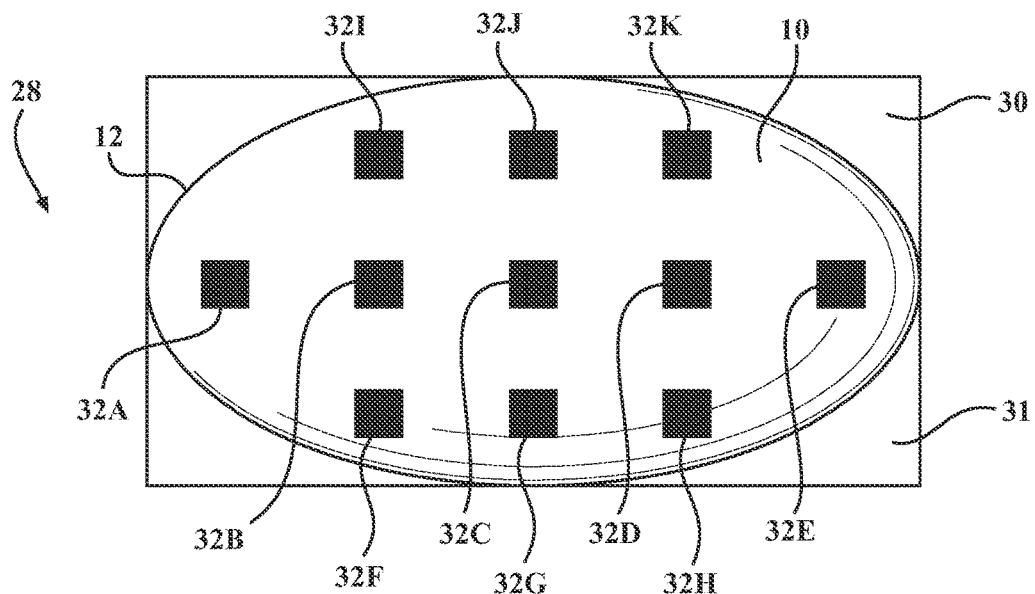

FIGS. 3A and 3B illustrate one example of an optical device 28 incorporating the deformable lens 10. FIG. 3A illustrates a side view of the optical device 28, while FIG. 3B illustrates a top view of the optical device 28. As can be shown in FIG. 3B, the deformable lens 10 has an oval shape. However, as explained previously, it should be understood that the deformable lens 10 can take any one of a number of different shapes.

In this example, the optical device 28 includes a substrate that may be a transparent layer 30 with a top side 31 and a bottom side 33. The top side 31 of the transparent panel 30 may be connected to the edge 12 of the deformable lens 10. The transparent layer 30 may be entirely transparent or may be partially transparent. Embedded within or placed within one or more cavities formed within the transparent layer 30 are one or more light sources in the forms of LEDs 32A-32K. However, it should be understood that instead of using LEDs, any type of source capable of emitting a suitable radiation can be used. In one example, the radiation emitted by the LEDs 32A-32K may be UV light. The LEDs 32A-32K are configured to selectively emit radiation that causes the curvature of the deformable lens 10 to change. Moreover, the curvature 17 of the first surface 13 and/or the curvature 19 of the second surface 15 may change based on the duration and/or intensity of the radiation emitted by the LEDs 32A-32K.

Also illustrated in this example is a light source 40 configured to output visible light, illustrated as beams 42A-42D towards the transparent layer 30 and eventually reaching the deformable lens 10. Moreover, the LEDs 32A-32K, while partially blocking some of the light emitted by the light source 40, are arranged within the transparent layer 30 so that at least a portion of the light emitted by the light source 40 can reach the deformable lens 10. The light source 40 may be any type of light source capable of producing visible light. The light source 40 may be a single light source or may be multiple light sources. As the curvature 17 of the first surface 13 and/or the curvature 19 of the second surface 15 may change based on the duration and/or intensity of the radiation emitted by the LEDs 32A-32K, the direction of the beams 42A-42D that pass through the deformable lens 10 is impacted.

The LEDs 32A-32K may be controlled using a lens control system 100, described later in this disclosure. The lens control system 100 may control the duration and/or intensity of the radiation emitted by the LEDs 32A-32K based on an input signal and/or based on information collected by a sensor system 120. Again, these components will be described in more detail later in this disclosure.

Figure 4:
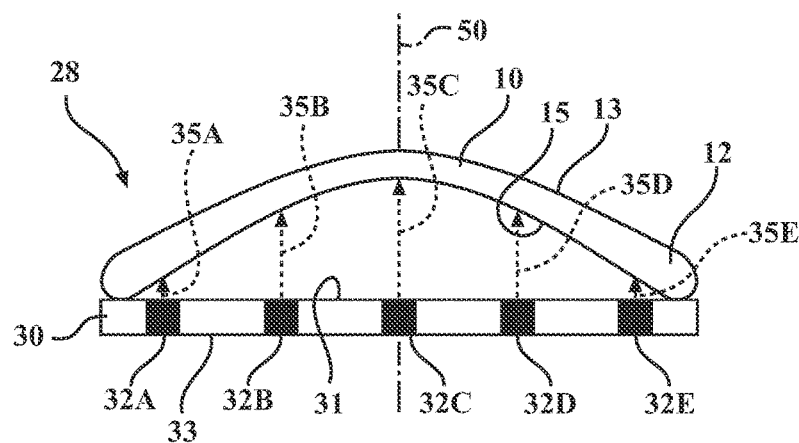
FIGS. 4-6 illustrate the change in the curvature of the deformable lens when irradiated at different intensity levels.
Figure 5:
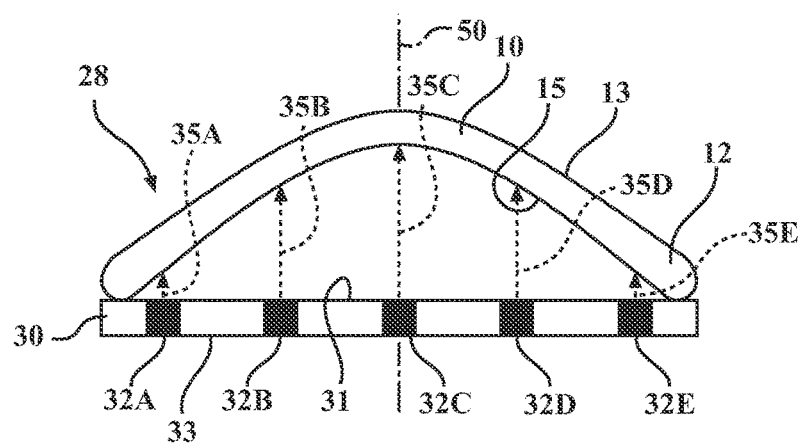
Figure 6:
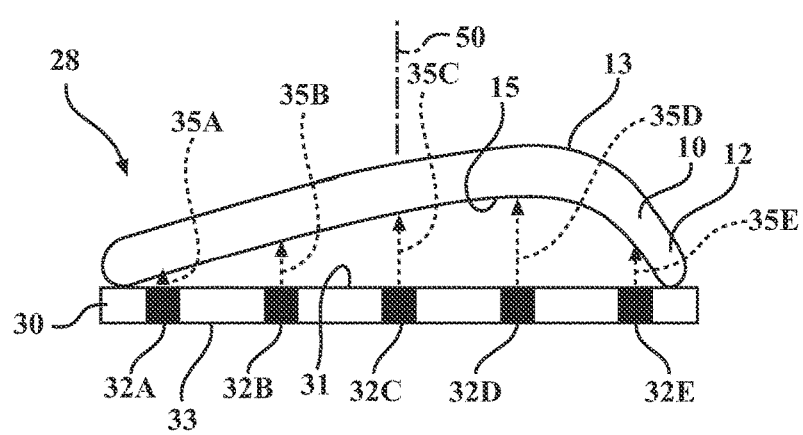

FIGS. 4-6 illustrate different examples of how the duration and intensity of radiation emitted by the LEDs 32A-32K can impact the curvature of the deformable lens 10 by changing the curvatures 17 and/or 19 of the first surface 13 and second surface 15 of the deformable lens 10. FIG. 4 illustrates LEDs 32A-32E emitting radiation 35A-35E, respectively, towards the deformable lens 10. In this example, the radiation 35A-35E causes the photoswitch material of the deformable lens 10 to expand, which then causes the curvatures 17 and/or 19 to change.

FIG. 5 illustrates a more extreme example, wherein the intensity of the radiation 35A-35E emitted by the LEDs 32A-32K is increased. When comparing the curvatures 17 and 19 of the deformable lens 10 of FIG. 4 to the curvatures 17 and 19 of the deformable lens 10 of FIG. 5, one can see that the intensity of the radiation 35A-35E impacts the curvatures 17 and 19. This change in the curvatures 17 and 19 impacts how light, such as visible light emitted by a light source 40 of FIGS. 1A and 3B, is focused/dispersed through the deformable lens 10.

The LEDs 32A-32K may be individually controllable such that each of the LEDs 32A-32K may emit different intensities of radiation for different durations. By adjusting the intensities and/or duration of radiation emitted by the LEDs 32A-32K, the deformable lens 10 can take different shapes, including shapes that are not symmetric. For example, the deformable lens 10 in FIGS. 4 and 5 are symmetrical across the centerline 50. In this example, the intensity of the radiation 35A-35E emitted by the LEDs 32A-32E may be substantially the same.

However, referring to FIG. 6, the intensity of the radiation 35A-35E emitted by the LEDs 32A-32E may vary between the LEDs 32A-32E. For example, the intensity of the radiation 35D emitted by the LED 32D may be more intense than the intensity of the radiation 35A-C and 35E emitted by the LEDs 32A-32C and 32E. This causes the deformable lens 10 not to be symmetrical across the centerline 50.

The change in the curvatures of the curvatures 17 and 19 illustrated in FIGS. 4-6 may be temporary. In other words, when radiation is no longer being emitted by the LEDs 32A-32C and 32E, the curvatures 17 and 19 may return to their non-irradiated or original shape.

Figure 7:
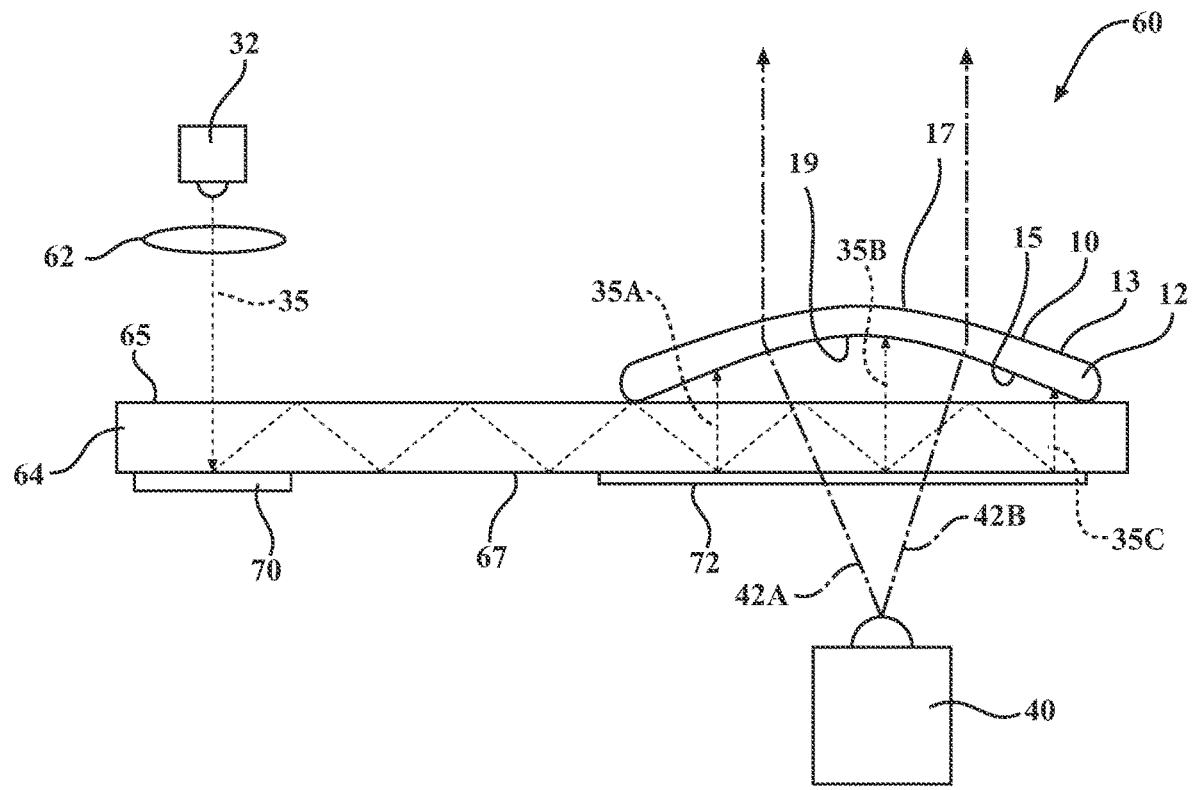
FIGS. 7-9 illustrate views of different optical devices having the deformable lens of FIG. 1 mounted onto a waveguide.

Referring to FIG. 7, another example of an optical device 60 incorporating the deformable lens 10 of FIG. 1 is shown. In this example, the optical device 60 includes an optical waveguide 64 having a top side 65 and a bottom side 67. The optical waveguide 64 may be at least partially transparent. The optical waveguide 64 is a physical structure that directs light from one location to another.

The optical device 60 also includes a light source, in the form of an LED 32, configured to output radiation that causes the curvatures 17 and 19 of the surfaces 13 and 15 of the deformable lens 10 to change. In this example, the LED 32 may be a UV light source that emits a radiation 35 directed to the optical waveguide 64 via an optical assembly 62. The optical assembly 62 can include one or more lenses that can direct the radiation 35 emitted by the LED 32 into the optical waveguide 64. It should be understood that the light, does not necessarily need to be an LED. Any type of source capable of producing a suitable radiation can be utilized.

The optical device 60 also includes diffraction gratings 70 and 72 coupled to the bottom side 67 of the optical waveguide 64. The diffraction grating 70 is positioned such that it generally opposes the direction of the radiation 35 directed into the optical waveguide 64. The diffraction grating 70 functions to reflect at least a portion of the radiation 35 that would normally pass through the optical waveguide 64 back into the optical waveguide 64 at an angle such that the reflected radiation 35 will travel along the optical waveguide 64.

The radiation 35 reflected by the diffraction grating 70 continues along the optical waveguide 64 until reaching the diffraction grating 72 coupled to the bottom side 67 of the optical waveguide 64 and substantially opposes the deformable lens 10. The radiation 35 received by the diffraction grating 72 is then reflected towards the deformable lens 10. The radiation reflected by the diffraction grating 72 then exits the optical waveguide 64 and is received by the deformable lens 10. In this example, the radiation 35 reflected by the diffraction grating 72 is shown as radiation 35A-35C. The radiation 35A-35C, as explained earlier, causes the photoswitch material of the deformable lens 10 to expand, thus causing the curvatures 17 and 19 of the surfaces 13 and 15 to change. This change in the curvatures 17 and 19 impacts the focus/dispersion of any light passing through the deformable lens 10.

In this example, the optical device 60 also includes the light source 40, which, as explained previously, emits visible light. In this example, visible light from light source 40 is shown as beams 42A and 42B. The light source 40 projects beams 42A and 42B to the deformable lens 10 through the diffraction grating 72 and the optical waveguide 64. As such, the diffraction grating 72 may be made to allow incident light to pass through the diffraction grating 72 to the deformable lens 10 but reflects light traveling along the light pipe 64 towards the deformable lens 64. The output focus/dispersion of the beams 42A and 42B is directly impacted by the curvatures 17 and 19 of the surfaces 13 and 15 of the deformable lens 10. The focus/dispersion of the beams 42A and 42B can be adjusted by adjusting the intensity of the radiation 35 outputted by the LED 32.

Figure 8:
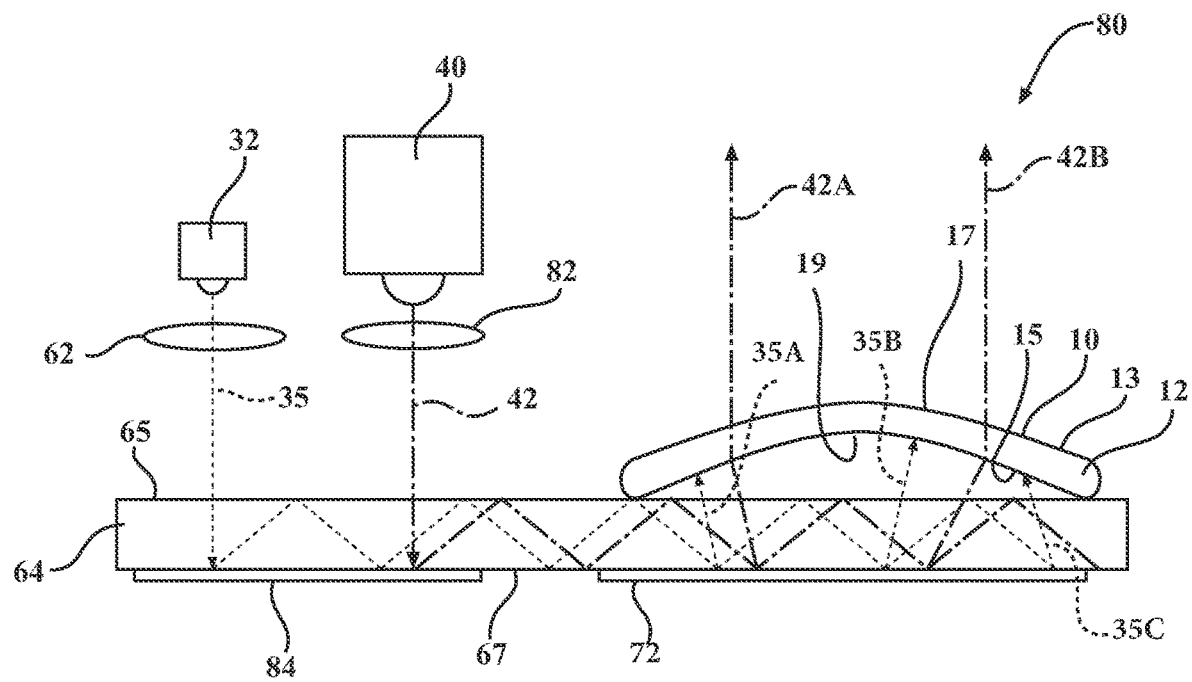

Referring to FIG. 8, another example of an optical device 80 incorporating the deformable lens 10 of FIG. 1 is shown. In this example, the optical device 80 is similar to the optical device 80 of FIG. 7, as such, like reference numerals have been utilized to refer to like elements. In this example, the optical device 80 includes a diffraction grating 84 coupled to the bottom side 67 of the optical waveguide 64. The diffraction grating 84 is similar to the diffraction grating 70 of FIG. 7 but has been sized and shaped for this particular application.

Here, the optical device 80 has the light source 40 located on the same side of the optical waveguide 64 as the LED 32 and the deformable lens 10. The beam 42 emitted by the light source 40 is directed into the optical waveguide 64 using an optical assembly 82 that may include one or more lenses for directing the beam 42 into the optical waveguide 64.

The diffraction grating 84 reflects a portion of the beam 42 introduced into the optical waveguide 64 back into the optical waveguide 64 so that it travels along the optical waveguide 64 towards the deformable lens 10. The diffraction grating 72, in addition to reflecting the radiation 35 emitted by the LED 32 also reflects the beam 42 towards the deformable lens 10. Reflections made by the diffraction grating 72 of the beam 42 are shown as beams 42A and 42B.

The optical device 80 has the advantage in that the LED 32 that emits the radiation 35 and the light source 40 that emits the beam 42 of optical light can both be located on the same side of the optical waveguide 64. In this case, the light source 40 and the LED 32 face the top side 65 of the optical waveguide 64. Alternatively, the reverse can also occur as well. For example, the LED 32, light source 40, and optical assemblies 62 and 82 can be located such that they face the bottom side 67 of the optical waveguide 64. In this case, the diffraction grating 84 would need to be located on the top side 65 of the optical waveguide 64.

Figure 9:
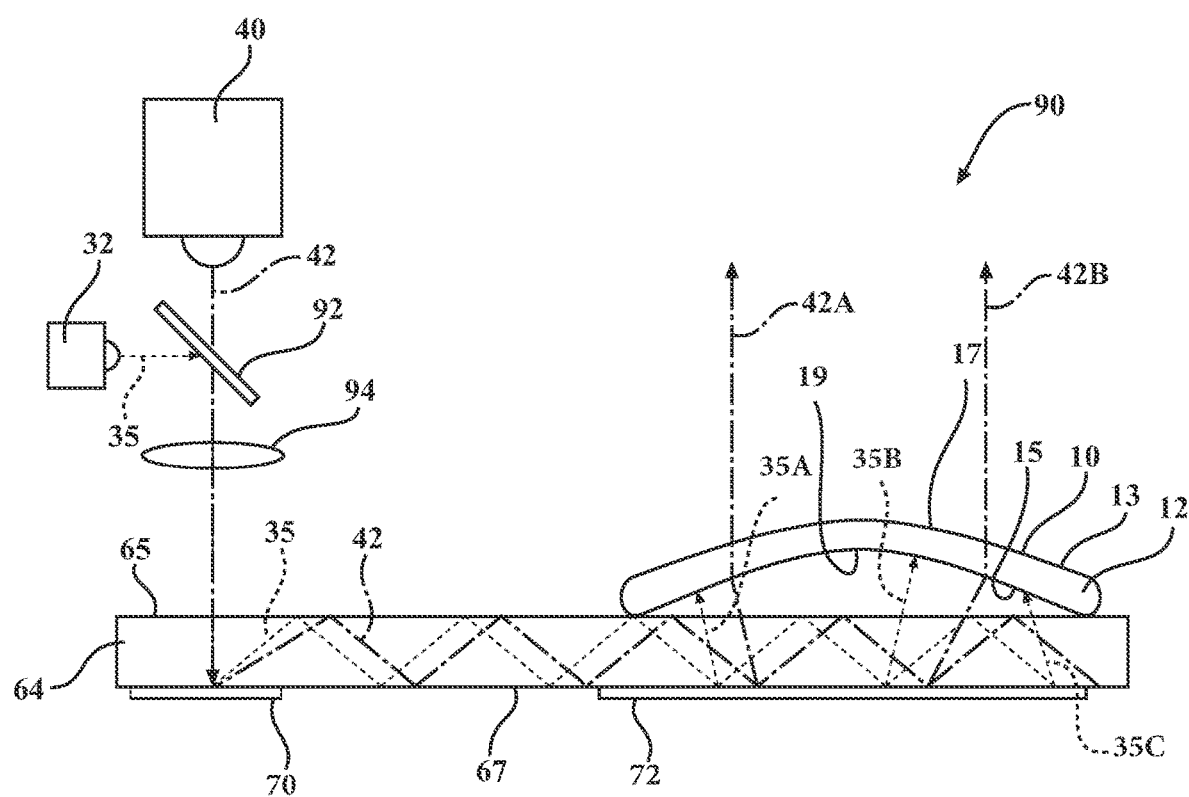

FIG. 9 illustrates another example of the optical device 90. The optical device 90 is similar to the optical device 60 of FIG. 7 and the optical device 80 of FIG. 8. As such, like reference numerals have utilized refer to like elements. In this example, the radiation 35 emitted by the LED is directed to an optical assembly 94 using a beam splitter 92 that effectively reflects the radiation 35 towards the optical assembly 94. The optical assembly 94 may be similar to the optical assembly 62 in that it directs the radiation 35 into the optical waveguide 64. In addition, the light source 40 that emits the beam 42 of visible light is also received by the beam splitter 92 such that it is passed through the beam splitter 92 towards the optical assembly 94. The optical assembly 94 directs the beam 42 into the optical waveguide 64 in the same manner that the optical assembly 94 directed the radiation 35 into the optical assembly 62.

The radiation 35 and the beam 42 directed into the optical waveguide 64 passes through the optical waveguide 64 and is reflected by the diffraction grating 70 back into the optical waveguide 64 such that both the radiation 35 and the beam 42 travel along the optical waveguide 64 towards the deformable lens 10. The diffraction grating 72 then reflects both the radiation 35 and the beam 42 towards the deformable lens 10 such that the radiation 35 and the beam 42 are received by the deformable lens 10. In this example, the radiation 35 received by the deformable lens 10 is shown as radiation 35A and 35B, while the beam 42 received by the deformable lens is shown as beams 42A and 42B.

In the example of the optical device 90, the relative positions of the LED 32 and the light source 40 may be reversed. For example, the radiation 35 emitted by the LED 32 may pass through the beam splitter 92 towards the optical waveguide 64, while the beam 42 emitted by the light source 40 may be reflected by the beam splitter 92 towards the optical waveguide 64.

Additionally, the optical device 90 shows the light source 40 and the LED 32 located on the same side of the optical waveguide as the deformable lens 10. As a variant, the optical, the light source 40, the LED 32, the optical assembly 94, and the beam splitter 92 can be located on the opposite side of the optical waveguide 64. In that case, the diffraction grating 70 would need to be coupled to the top side 65 of the optical waveguide 64.

Figure 10:
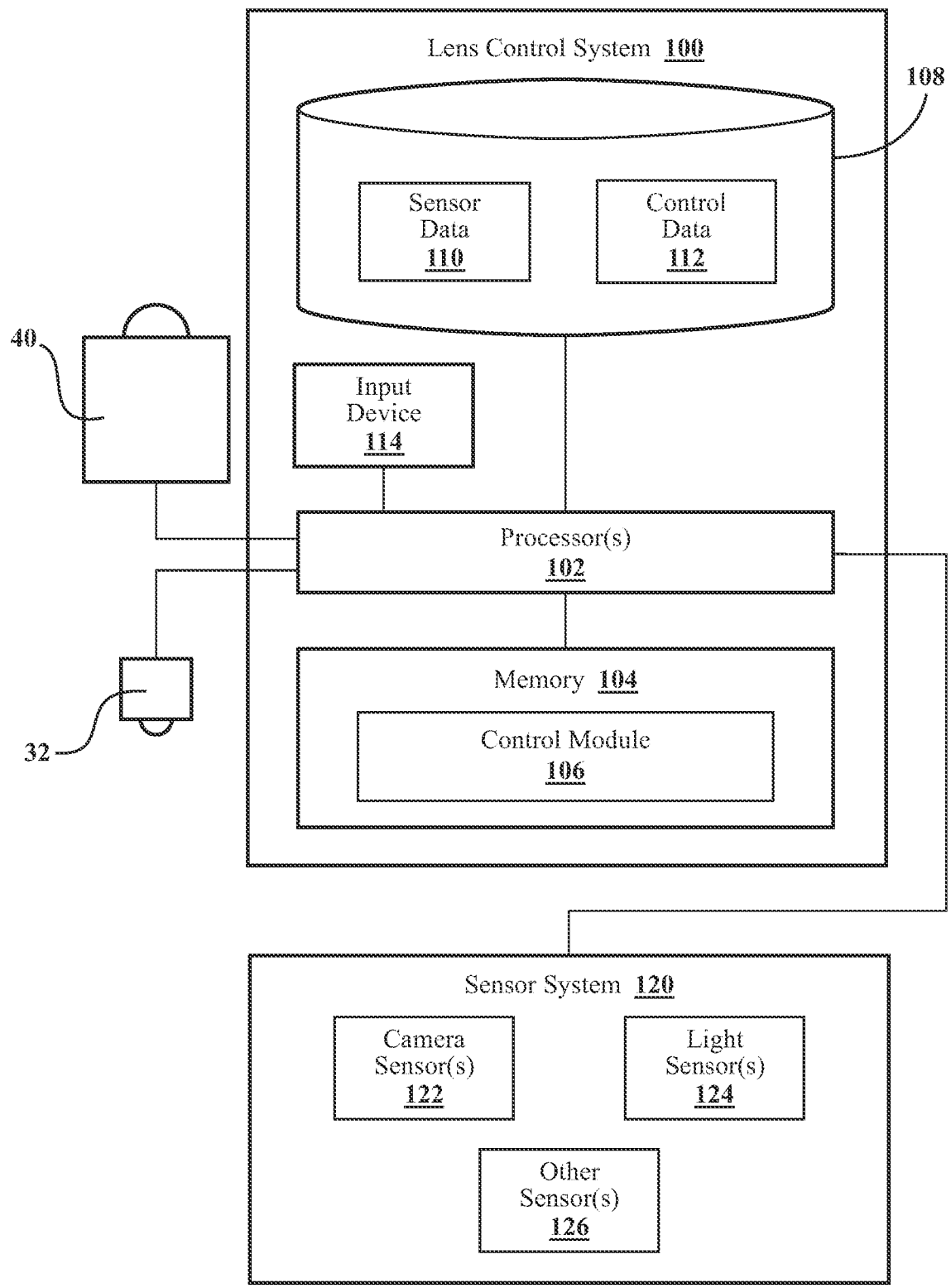
FIG. 10 illustrates a block diagram of a lens control system for controlling the curvature of the deformable lens of FIG. 1.

As stated previously, the intensity and/or duration of the radiation emitted by light sources, such as the LEDs 32A-32K of FIG. 3A and the LED 32 of FIGS. 7-9, can be controlled utilizing a lens control system 100. Referring to FIG. 10, illustrated is a more detailed illustration of the lens control system 100. It will be understood that in various embodiments, it may not be necessary for the lens control system 100 to have all of the elements shown in FIG. 10. The lens control system 100 can have any combination of the various elements shown in FIG. 10.

Further, the lens control system 100 can have additional elements to those shown in FIG. 10. In some arrangements, the lens control system 100 may be implemented without one or more of the elements shown in FIG. 10. While the various elements are shown as being located within the lens control system 100, it will be understood that one or more of these elements can be located external to the lens control system 100. Further, the elements shown may be physically separated by large distances and provided as remote services (e.g., cloud-computing services).

Also, for illustrative purposes, FIG. 10 illustrates the lens control system 100 being connected to the light source 40 and the LED 32. However, it should be understood that the lens control system 100 can be connected to any one of a number of different light sources that can vary from application to application. For example, the lens control system 100 can be connected to multiple light sources capable of emitting radiation that can cause the curvature of the deformable lens 10 to change. As an alternative, the lens control system 100 may be such that it only controls light sources that emit radiation that causes the curvature of the formable lens to change. In those situations, the light source 40 may be controlled by a different system altogether and not connected to the lens control system 100 as shown.

As shown, the lens control system 100 includes one or more processor(s) 102. Accordingly, the processor(s) 102 may be a part of the lens control system 100 or the lens control system 100 may access the processor(s) 102 through a data bus or another communication path. In one or more embodiments, the processor(s) 102 is an application-specific integrated circuit that is configured to implement functions associated with control module 106. In general, the processor(s) 102 is an electronic processor such as a microprocessor that is capable of performing various functions as described herein. In one embodiment, the lens control system includes a memory 104 that stores the control module 106. The memory 104 may be a random-access memory (RAM), read-only memory (ROM), a hard disk drive, a flash memory, or other suitable memory for storing the control module 106. The control module 106 is, for example, computer-readable instructions that, when executed by the processor(s) 102, cause the processor(s) 102 to perform the various functions disclosed herein.

Furthermore, in one embodiment, the lens control system 100 includes a data store 108. The data store 108 is, in one embodiment, an electronic data structure such as a database that is stored in the memory 104 or another memory and that is configured with routines that can be executed by the processor(s) 102 for analyzing stored data, providing stored data, organizing stored data, and so on. Thus, in one embodiment, the data store 108 stores data used by control module 106 to execute various functions. In one embodiment, the data store 108 includes sensor data 110, control data 112, and, for example, other information used by the control module 106.

The lens control system 100 may also include an input device 114 capable of sending commands to the processor(s) 102. The input device 114 may be incorporated within the lens control system 100, as shown, or may be separate from the lens control system 100. The input device 114 includes any device, component, system, element or arrangement, or groups that enable information/data to be entered into a machine. The input device 114 can receive input from a human or another electronic system. Information from the input device 114 may be stored within the data store 108 as the control data 112.

A sensor system 120 may be in communication with the lens control system 100. The sensor system 120 may be separate from the lens control system 100, as shown, or may be incorporated within the lens control system 100. The sensor system 120 may include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 102 and/or another element of the lens control system 100. Information collected by the sensor system 120 may be stored within the data store 108 as the sensor data 110.

The sensor system 120 can include any suitable type of sensor. Various examples of different types of sensors will be described herein. However, it will be understood that the embodiments are not limited to the particular sensors described. For example, the sensor system 120 may include one or more camera sensor(s) 122 and/or light sensor(s) 124. In one example, the camera sensor(s) 122 and/or light sensor(s) 124 may be configured and disposed such that they can measure the intensity of radiation output by the LED 32. In this case, the camera sensor(s) 122 and/or light sensor(s) 124, by measuring the radiation output by the LED 32, can provide some indication regarding how much radiation is being provided to the deformable lens 10, which impacts the curvature of the deformable lens 10. Further still, if the sensor system 120 includes a camera sensor(s) 122, the camera sensor(s) 122 can capture images of the deformable lens 10 to measure the curvature of the deformable lens 10.

Additionally, the sensor system 120 can include other types of sensor(s) 126 that can vary from application to application. For example, the other types of sensor(s) 126 other types of sensors could include sonar sensors, radar sensors, temperature sensors, LIDAR sensors, and the like. Information collected from these sensors can also be stored within the sensor data 110 of the data store 108.

As stated above, the control module 106 includes instructions that, when executed by the processor(s) 102, cause the processor(s) 102 to perform any one of a number of different functions described in this disclosure. In one example, the control module 106 includes instructions that, when executed by the processor(s) 102, cause the processor(s) 102 to receive one or more signals from the sensor system 120. The one or more signals may be directly received from any one of the sensors forming the sensor system 120 or may be signals stored within the sensor data 110. Further still, the signals received by the processor(s) 102 may have been filtered, amplified, digitized, or otherwise changed to make discernible by the processor(s) 102.

The control module 106 may also include instructions that, when executed by the processor(s) 102, cause the processor(s) 102 to compare the one or more signals received by the processor(s) 102 to a property. The property can be a threshold, some other variable or known quantity, formula, or algorithm that can be used to interpret the one or more signals received by the processor(s) 102. For example, if the one or more signals received by the processor(s) 102 relate to the intensity of radiation emitted by the LED 32, the processor(s) 102 can compare these one or more signals to a threshold to determine if the LED 32 is outputting the expected radiation. Depending upon this comparison, the control module 106 may also include instructions that, when executed by the processor(s) 102, cause the processor(s) 102 to adjust the intensity of the radiation output by the LED 32. If the intensity of the radiation output by the LED 32 is not appropriate, the processor(s) 102 can adjust the intensity by controlling the LED 32.

The control module 106 may also include instructions that, when executed by the processor(s) 102, cause the processor(s) 102 to receive one or more signals from the input device 114. Like the one or more signals received from the sensor system 120, the one or more signals received by the processor(s) 102 may be directly received from the input device 114 or may be signals stored within the control data 112. Further, the one or more signals received by the processor(s) 102 may have been filtered, amplified, digitized, or otherwise changed to make discernible by the processor(s) 102.

The control module 106 may also include instructions that, when executed by the processor(s) 102, cause the processor(s) 102 to adjust the intensity of the radiation output by the LED 32 based on the one or more signals received by the processor(s) 102. For example, the input device 114 can receive input from a human operator that wants to change the curvature of the deformable lens 10. Based on the input from the human operator, the processor(s) 102 can receive this input and adjust the radiation output by the LED 32, which impacts the curvature of the deformable lens 10.

Figure 11:
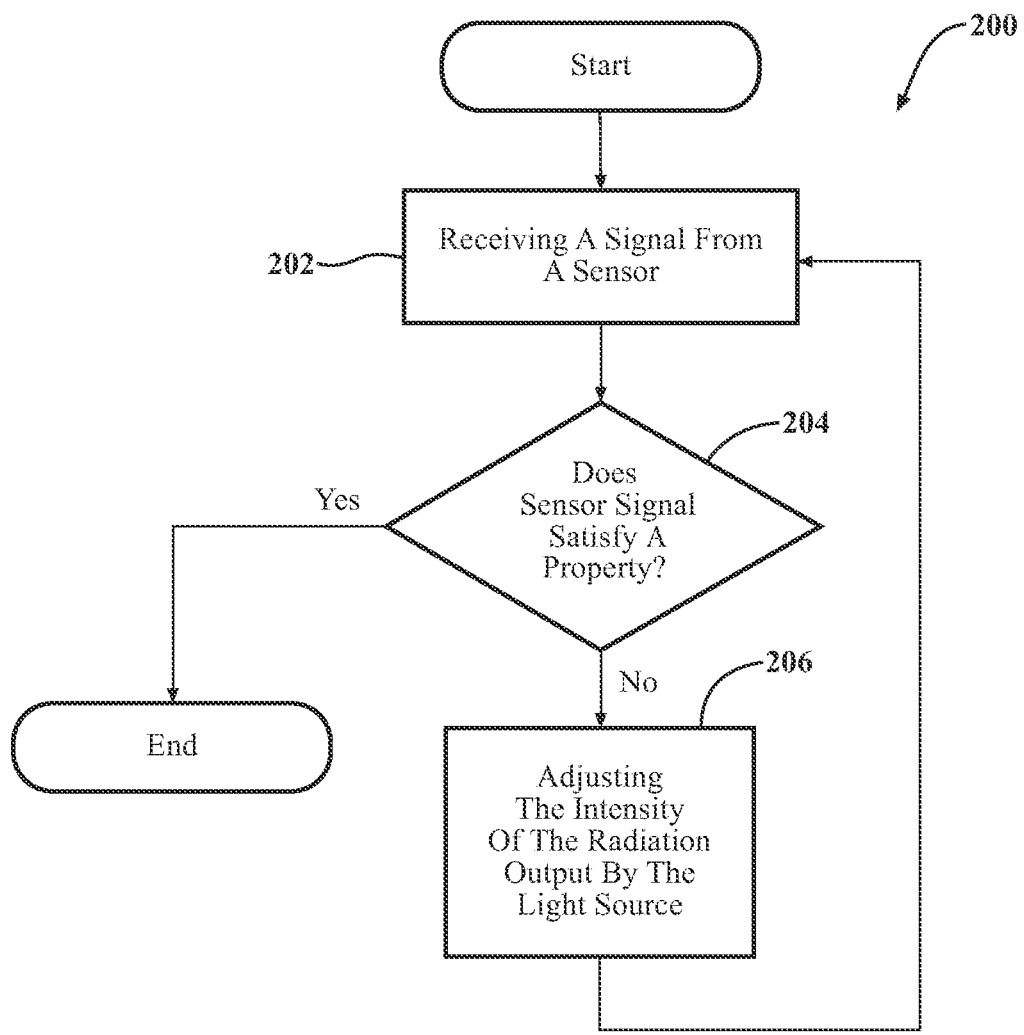
FIGS. 11 and 12 illustrate methods for controlling the curvature of the surface of the deformable lens of FIG. 1.

Referring to FIG. 11, a method 200 for adjusting the curvature of the deformable lens is shown. The method 200 will be described from the viewpoint of the lens control system 100 of FIG. 10 and the optical device 28 of FIGS. 3A and 3B. However, it should be understood that this is just one example of implementing the method 200. While method 200 is discussed in combination with the lens control system 100, it should be appreciated that the method 200 is not limited to being implemented within the lens control system 100 but is instead one example of a system that may implement the method 200.

In step 202, the control module 106 causes the processor(s) 102 to receive one or more signals from the sensor system 120. As explained previously, one or more signals may be directly received from any one of the sensors forming the sensor system 120 or may be signals stored within the sensor data 110. Further still, the signals received by the processor(s) 102 may have been filtered, amplified, digitized, or otherwise changed to make discernible by the processor(s) 102.

In step 204, the control module 106 causes the processor(s) 102 to compare the one or more signals received by the processor(s) 102 to a property. The property can be a threshold, some other variable or known quantity, formula, or algorithm that can interpret the one or more signals received by the processor(s) 102. For example, if the one or more signals received by the processor(s) 102 relate to the intensity of radiation emitted by the LEDs 32A-32K, the processor(s) 102 can compare these one or more signals to a threshold to determine if the LEDs 32A-32K are outputting the expected radiation.

If the comparison to the property performed in step 204 is satisfied, the method 200 may either end or start from the beginning. Otherwise, the method 200 proceeds to step 206, wherein the control module 106 causes the processor(s) 102 to adjust the intensity of the radiation output by the LED 32. If the intensity of the radiation output by the LED 32 is not appropriate, the processor(s) 102 can adjust the intensity by controlling the LEDs 32A-32K. As explained previously, the LEDs 32A-32K may be individually controlled such that the intensity of the radiation emitted by each of the LEDs 32A-32K can be individually adjusted by the processor(s) 102. Once step 206 is complete, the method 200 may then return to step 202. Eventually, the method 200 will adjust the intensity of the radiation so that it is correct.

Figure 12:
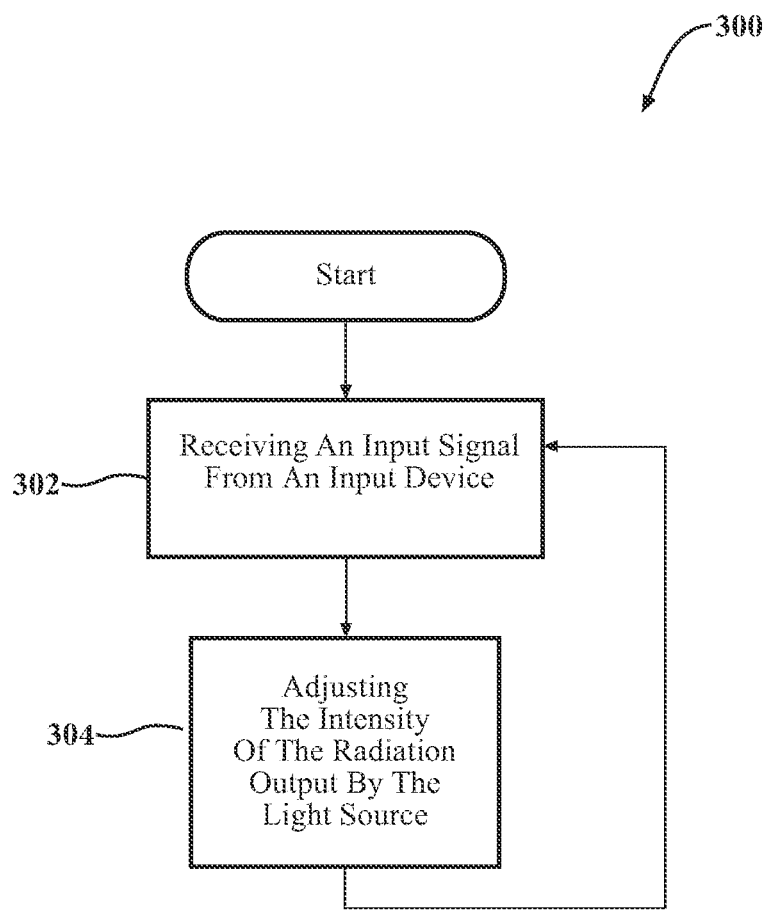

Referring to FIG. 12, a method 300 for adjusting the curvature of the deformable lens based on sensor information is shown. The method 300 will be described from the viewpoint of the lens control system 100 of FIG. 10 and the optical device 28 of FIGS. 3A and 3B. However, it should be understood that this is just one example of implementing the method 300. While method 300 is discussed in combination with the lens control system 100, it should be appreciated that the method 300 is not limited to being implemented within the lens control system 100 but is instead one example of a system that may implement the method 300.

In step 302, the control module 106 causes the processor(s) 102 to receive one or more signals from the input device 114. Like the one or more signals received from the sensor system 120, the one or more signals received by the processor(s) 102 may be directly received from the input device 114 or may be signals stored within the control data 112. Further, the one or more signals received by the processor(s) 102 may have been filtered, amplified, digitized, or otherwise changed to make discernible by the processor(s) 102.

In step 304, the control module 106 causes the processor(s) 102 to adjust the intensity of the radiation output by the LEDs 32A-32K based on the one or more signals received by the processor(s) 102. For example, the input device 114 can receive input from a human operator that wants to change the curvature of the deformable lens 10. Based on the input from the human operator, the processor(s) 102 can receive this input and adjust the radiation output by the LEDs 32A-32K, which affects the curvature of the deformable lens 10. Thereafter, the method 300 may either end or start from the beginning and wait for another signal from the input device.

The methods 200 and 300 can be combined. For example, the method 200 adjusts the radiation output by the LEDs 32A-32K based on feedback from the sensor system 120, while the method 200 adjusts the radiation output by the LEDs 32A-32K based on input from the input device 114. The methods 200 and 300 can be combined to not only allow for the adjustment of radiation based on signals from an input device but can also check to make sure that the radiation output by the by the LEDs 32A-32K and/or the curvature of the deformable lens 10 matches what is expected based on the input from the input device 114.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An optical device comprising:
a deformable lens having a photoswitch material that, when irradiated by a radiation, causes a curvature of a surface of the deformable lens to change from a first curvature to a second curvature based on an intensity of the radiation; and
a transparent layer coupled to an edge of the deformable lens that includes a plurality of light sources incorporated within the transparent layer and configured to selectively output the radiation that causes the curvature of the surface of the deformable lens to change from the first curvature to the second curvature.

2. The optical device of claim 1, wherein the photoswitch material is spiropyran.

3. The optical device of claim 1, wherein the deformable lens is a meniscus lens having a convex surface and a concave surface that meet at the edge.

4. The optical device of claim 1 wherein the plurality of light sources are arranged to allow at least a portion of a visible light from a second light source to pass through the transparent layer to the deformable lens.

5. The optical device of claim 1, wherein a first portion of the plurality of light sources output the radiation at a first intensity and a second portion of the plurality of light sources output the radiation at a second intensity.

6. An optical device comprising:
a deformable lens having a photoswitch material that, when irradiated by a radiation, causes a curvature of a surface of the deformable lens to change from a first curvature to a second curvature based on an intensity of the radiation;
a waveguide attached to an edge of the deformable lens and having diffraction gratings adjacent to the deformable lens; and
a first light source configured to output the radiation into the waveguide that outputs a portion of the radiation to the deformable lens via the diffraction gratings.

7. The optical device of claim 6,
wherein the waveguide has a first side and a second side being opposite of the first side, the edge of the deformable lens being attached to the first side; and
a second light source being located adjacent to the second side and configured to output visible light that travels through the waveguide to the deformable lens.

8. The optical device of claim 7, wherein the first light source is adjacent to the first side.

9. The optical device of claim 6,
wherein the waveguide has a first side and a second side being opposite of the first side, the edge of the deformable lens being attached to the first side; and
a second light source being located adjacent to the first side and configured to output visible light that travels through the waveguide to the deformable lens.

10. The optical device of claim 1, wherein the photoswitch material is at least one of embedded within the deformable lens and coated on the surface of the deformable lens.

11. A system comprising:
a deformable lens having a photoswitch material that, when irradiated by a radiation, causes a curvature of a surface of the deformable lens to change from a first curvature to a second curvature based on an intensity of the radiation;
a processor;
a light source in communication with the processor and configured to selectively output the radiation that causes the curvature of the surface of the deformable lens to change from the first curvature to the second curvature; and
a memory in communication with the processor, the memory including a control module having instructions that, when executed by the processor, cause the processor to adjust the intensity of the radiation output by the light source.

12. The system of claim 11, wherein the photoswitch material is spiropyran.

13. The system of claim 11, wherein the control module further includes instructions that, when executed by the processor, cause the processor to adjust the intensity of the radiation output by the light source based on a signal from a sensor configured to measure at least one of the intensity of the radiation output by the light source and the curvature of the surface of the deformable lens.

14. The system of claim 11, wherein the control module further includes instructions that, when executed by the processor, cause the processor to adjust the intensity of the radiation output by the light source based on an input signal from an input device.

15. A method comprising adjusting an intensity of a radiation output by a light source to a deformable lens based on a signal output by a sensor indicating at least one of an intensity of the light source and a curvature of the surface of the deformable lens, wherein the deformable lens includes a photoswitch material that, when irradiated by the radiation, causes the curvature of a surface of the deformable lens to change from a first curvature to a second curvature based on the intensity of the radiation.

16. The method of claim 15, further comprising adjusting the intensity of the radiation output by the light source based on an input signal from an input device.

17. The method of claim 15, wherein the photoswitch material is spiropyran.

\* \* \* \* \*